United States Patent
Xia et al.

(10) Patent No.: US 8,412,398 B2
(45) Date of Patent: Apr. 2, 2013

(54) UNSTABLE SIGNAL DETECTION FOR ELECTRO-MECHANICAL VEHICLE COMPONENT

(75) Inventors: Houchun Xia, Troy, MI (US); Robert L. Morris, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 203 days.

(21) Appl. No.: 13/052,314

(22) Filed: Mar. 21, 2011

(65) Prior Publication Data

US 2012/0245771 A1    Sep. 27, 2012

(51) Int. Cl.
*B60L 9/00* (2006.01)
*G06F 7/00* (2006.01)

(52) U.S. Cl. ............................................ 701/22; 701/58
(58) Field of Classification Search .................. None
See application file for complete search history.

(56) References Cited

U.S. PATENT DOCUMENTS

2011/0029208 A1    2/2011   Xia

*Primary Examiner* — Thomas Tarcza
*Assistant Examiner* — Adam Alharbi
(74) *Attorney, Agent, or Firm* — Quinn Law Group, PLLC

(57) ABSTRACT

An example vehicle includes a motor and a gearbox. A controller is configured to identify oscillation peaks of a performance signal representing the rotational speed of the motor, the input speed of the gearbox, or the amount of torque generated by the motor or provided to the gearbox. The controller is configured to simultaneously detect unstable regular and irregular oscillations of the performance signal given the oscillation peaks identified and substantially dampen the unstable oscillations detected. An example method may include determining a mean of the performance signal and defining peak values, including peak moving average values or filtered peak values, representing a magnitude of at least two oscillation peaks. The method further includes simultaneously detecting the unstable regular and irregular oscillations of the performance signal using the defined values and substantially dampening the unstable oscillations.

19 Claims, 2 Drawing Sheets

UNSTABLE SIGNAL DETECTION FOR ELECTRO-MECHANICAL VEHICLE COMPONENT

TECHNICAL FIELD

The disclosure relates to detecting unstable signals in electro-mechanical vehicle components.

BACKGROUND

Passenger and commercial vehicles include various electro-mechanical components. For instance, some hybrid vehicles have one or more electric motors that generate a torque from electrical energy. A gearbox converts the torque received and outputs a propulsion torque to propel the vehicle.

SUMMARY

An example vehicle includes a motor that generates a torque. A gearbox is configured to receive the torque generated by the motor. An input speed of the gearbox is at least partially defined by the torque received. A controller is configured to identify oscillation peaks of a performance signal representing the rotational speed of the motor, the input speed of the gearbox, or the motor torque. The controller is configured to determine a mean of the performance signal, and identify a first value representing a first oscillation peak of the performance signal and a second value representing a second oscillation peak of the performance signal based on the mean. The controller may be further configured to simultaneously detect unstable regular and irregular oscillations of the performance signal based, at least in part, on the first value and the second value. Moreover, the controller may be configured to substantially dampen the unstable regular and irregular oscillations detected.

An example method includes determining a mean of a performance signal having oscillation peaks and representing a rotational speed of or an amount of torque generated by a hybrid vehicle component. The method further includes defining a first value representing a magnitude of a first oscillation peak relative to the mean of the performance signal and defining a second value representing a magnitude of a second oscillation peak relative to the mean of the performance signal. The method also includes simultaneously detecting, via a controller, unstable regular and irregular oscillations of the performance signal based, at least in part, on the first value and the second value. The method may also include substantially dampening the unstable regular and/or irregular oscillations detected.

The above features and the advantages of the present disclosure are readily apparent from the following detailed description of the best modes for carrying out the invention when taken in connection with the accompanying drawings.

DETAILED DESCRIPTION

A vehicle is provided with a controller configured to identify and substantially dampen oscillation peaks of a performance signal representing, for instance, a speed of or amount of torque generated by a vehicle component. The controller may determine a mean of the performance signal and define values representing magnitudes of two or more oscillation peaks from the mean of the performance signal. Each value may represent, e.g., a peak of an oscillation, a moving average of the performance signal, or a filtered peak of an oscillation. With the values, the controller may simultaneously detect unstable regular and irregular oscillations of the performance signal and substantially dampen the unstable oscillations detected. The vehicle may take many different forms and include multiple and/or alternate components and facilities. While an example vehicle is shown in the Figures, the components illustrated in the Figures are not intended to be limiting. Indeed, additional or alternative components and/or implementations may be used. For example, the vehicle 100 may be any passenger or commercial automobile such as a hybrid electric vehicle including a plug-in hybrid electric vehicle (PHEV) or an extended range electric vehicle (EREV), a gas-powered vehicle, a battery electric vehicle (BEV), or the like.

Figure 1:
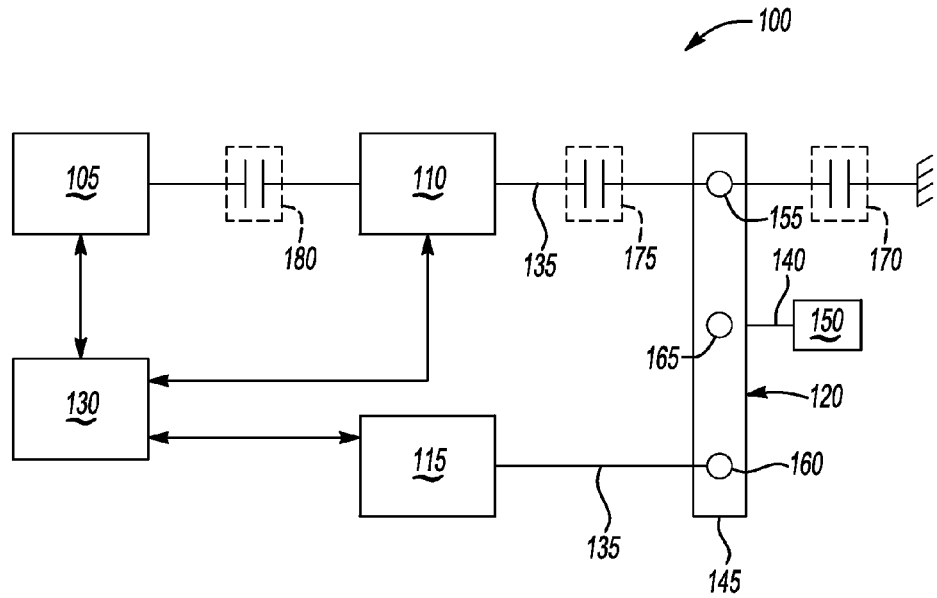
FIG. 1 is a schematic diagram of an example vehicle having a controller configured to simultaneously detect and substantially dampen regular and irregular oscillations of a performance signal.

FIG. 1 illustrates an example vehicle 100 that includes an engine 105, a first electric motor 110, a second electric motor 115, a gearbox 120, and a controller 130. The vehicle 100, in an alternative approach, may include additional or fewer motors than the two motors 110, 115 illustrated in FIG. 1.

The engine 105 may include any device configured to generate an engine torque by converting a fuel into rotational motion. For example, the engine 105 may be an internal combustion engine configured to generate rotational motion by combusting a fuel and air mixture. In one possible approach, the engine torque may be used to propel the vehicle 100. An engine control unit (not shown) may be used to control the operation of the engine 105 by, e.g., commanding the engine 105 to rotate at a particular speed or to generate a particular torque. Therefore, the engine 105 may be configured to generate the engine torque as commanded by the engine control unit.

The first motor 110 may include any device configured to generate a first motor torque by converting electrical energy into rotational motion. For instance, the first motor 110 may be configured to receive electrical energy either directly or indirectly from a power source (not shown), such as a battery. In one possible implementation, the power source may be configured to output direct current (DC) electrical energy, and an inverter (not shown) may convert the DC electrical energy from the power source into altering current (AC) electrical energy. The first motor 110 may be configured to generate rotational motion, and thus the first motor torque, using the AC electrical energy received from the inverter. The first motor 110 may be further configured to generate electrical energy when provided with a torque. That is, the first motor 110 may be configured to receive, e.g., the engine torque and generate electrical energy when provided with the engine torque. The electrical energy generated by the first motor 110 may be stored in the power source.

The second motor 115 may include any device configured to generate a second motor torque by converting electrical energy received from, e.g., the power source into rotational motion. The second motor 115 may be configured to receive the electrical energy directly from the power source or indirectly via, e.g., the inverter. The second motor 115, in one possible approach, may be configured to generate electrical energy when provided with a torque, such as the engine torque and/or the first motor torque.

The gearbox 120, represented as a lever diagram, may include any device configured to convert a received torque into a propulsion torque using various gear ratios. For example, the gearbox 120 may receive and convert at least one of the engine torque, the first motor torque, and the second motor torque into the propulsion torque, and output the propulsion torque to propel the vehicle 100. The gearbox 120 may include an input shaft 135, an output shaft 140, and at least one gear set 145. The input shaft 135 may be configured to receive the torque provided by the engine 105, the first motor 110, and/or the second motor 115 and rotate at a speed in accordance with the torque received. The input speed of the gearbox 120 may be based at least in part on the torque provided to the input shaft 135. The output shaft 140 may be configured to provide the propulsion torque to the wheels 150 of the vehicle 100. Each gear set 145 may include any number of gears configured to convert the torque received via the input shaft 135 to the propulsion torque output via the output shaft 140. As illustrated in FIG. 1, the gearbox 120 includes a first node 155, a second node 160, and a third node 165. The first node 155 may be configured to receive the engine torque, the first motor torque, or both. The second node 160 may be configured to receive the second motor torque. The third node 165 may be configured to provide the propulsion torque to the wheels 150 of the vehicle 100. Although only one gear set 145 is illustrated, the gearbox 120 may include any number of gear sets, each having any number of nodes.

One or more clutches may be used in the vehicle 100. As illustrated in FIG. 1, the vehicle 100 may include a first clutch 170, a second clutch 175, and a third clutch 180. Each clutch may include any device configured to engage to transfer torque. For example, each clutch may include a driving mechanism and a driven mechanism configured to engage. When engaged, a torque provided to the driving mechanism may cause the driven mechanism to rotate at substantially the same speed as the driving mechanism. When disengaged, however, the driving mechanism and driven mechanism are free to rotate at different speeds. The engagement and/or disengagement of the clutches used with the vehicle 100 may place the vehicle 100 in different operating modes since engaging different clutches may provide torque from different sources (e.g., the engine 105, the first motor 110, the second motor 115, etc.) to the gearbox 120. The first clutch 170 may have a grounded driving mechanism so that, e.g., the driving mechanism may prevent the driven mechanism from rotating when the first clutch 170 is engaged. The first clutch 170 may be configured to engage so that the second motor torque may be provided to the gearbox 120 and at least partially contribute to the propulsion torque output by the third node 165. The second clutch 175 may be operably connected to the first motor 110 and the gearbox 120 and may be configured to engage to transfer the first motor torque, the engine torque, or both, to the gearbox 120. The third clutch 180 may be operably connected to the engine 105 and the first motor 110. When engaged, the third clutch 180 may transfer the engine torque to the first motor 110 and/or the gearbox 120.

The controller 130 may include any device configured to determine the rotational speed of or amount of torque generated by one or more components of the vehicle 100, such as the engine 105, the first motor 110, the second motor 115, and or the input shaft 135 of the gearbox 120. The controller 130 may be configured to generate or receive a performance signal representing the speed or torque determined. For instance, the controller 130 may use a sensor (not shown) located on or near the input shaft 135 that is configured to measure the rotational speed of or the amount of torque provided to the input shaft 135. Alternatively, the controller 130 may infer the speed of or amount of torque provided to the input shaft 135 from, e.g., the operating mode of the vehicle 100 (e.g., based on which clutch or clutches are engaged), the amount of torque generated by the engine 105, the first motor 110, or the second motor 115, or from signals generated by, e.g., an engine control unit (not shown), a motor control unit (not shown), and/or a transmission control unit (not shown).

The controller 130 may further be configured to identify and dampen oscillation peaks of the performance signal. For example, the controller 130 may be configured to determine the mean of the performance signal and identify values associated with the oscillation peaks based at least in part on the determined mean. That is, the controller 130 may be configured to identify a first value representing a magnitude of a first oscillation peak and a second value representing the magnitude of a second oscillation peak. The controller 130 may identify the first value and the second value relative to the mean. In one possible approach, the second oscillation peak may be subsequent, and in some instances, consecutive to the first oscillation peak. The first value and the second value may both represent magnitudes that are either above or below the mean. Values above the mean may be referred to as positive values while values below the mean may be referred to as negative values.

The controller 130 may be further configured to simultaneously detect regular and irregular oscillations of the performance signal using, e.g., the first value and the second value. To detect the regular oscillations, the controller 130 may be configured to compare the first value to the second value. If the magnitudes represented by the first value and the second value are substantially equal, and the magnitudes represented by each value are greater than a predetermined threshold, the controller 130 may be configured to determine that the first value and the second value represent possibly unstable regular oscillation peaks. The controller 130 may be further configured to identify additional values representing subsequent consecutive oscillation peaks after the second oscillation peak, and detect the unstable regular oscillations if a predetermined number of consecutive values are substantially equal to one another. To detect unstable irregular oscillations, the controller 130 may be configured to identify a first moving average value and a second moving average value from the oscillation peaks of the performance signal. The controller 130 may be further configured to compare the first moving average value to the second moving average value and detect the irregular oscillations based on, e.g., a difference between first and second moving average values.

The controller 130 may also be configured to detect unstable irregular oscillations by applying a filter, such as a low pass filter, to the performance signal to generate a filtered oscillation peak signal. The controller 130 may be configured to define a first oscillation peak value and a second oscillation peak value from consecutive oscillation peaks of the filtered oscillation peak signal and compare the first oscillation peak value to the second oscillation peak value to detect oscillations of the filtered oscillation peak signal that may represent oscillations of the performance signal.

The controller 130 may also be configured to identify various conditions of the performance signal based, at least in part, on the values of the performance signal, the moving average signal, and/or the filtered oscillation peak signal. For example, the controller 130 may be configured to identify a spike condition if the second value is substantially greater than the first value. The controller 130 may be configured to identify a growing condition if one value is greater than the preceding value by at least a predetermined margin, and in one possible implementation, if a predetermined number of consecutive values are substantially greater than the preceding ones. The controller 130 may be configured to identify a ringing condition if two or more consecutive values are substantially equal to one another.

The controller 130 may be further configured to separately consider positive values and negative values of the performance signal, the moving average signal, and/or the filtered oscillation peak signal relative to the mean. That is, the controller 130 may be configured to identify both the first value and the second value as each having a magnitude greater than the mean as positive values and less than the mean as negative values. The controller 130 may further define the first value as the peak magnitude of one positive oscillation peak and the second value as the peak magnitude of the next positive oscillation peak. Alternatively, the controller 130 may define the first value as the peak (e.g., absolute value) magnitude of one negative oscillation and the second value as the peak (e.g., absolute value) magnitude of the next negative oscillation. This way, the controller 130 can separately consider peaks of the oscillations that are either positive or negative relative to the mean of the performance signal.

In general, computing systems and/or devices, such as the controller 130, etc., may employ any of a number of computer operating systems and may include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in any one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

Figure 2:
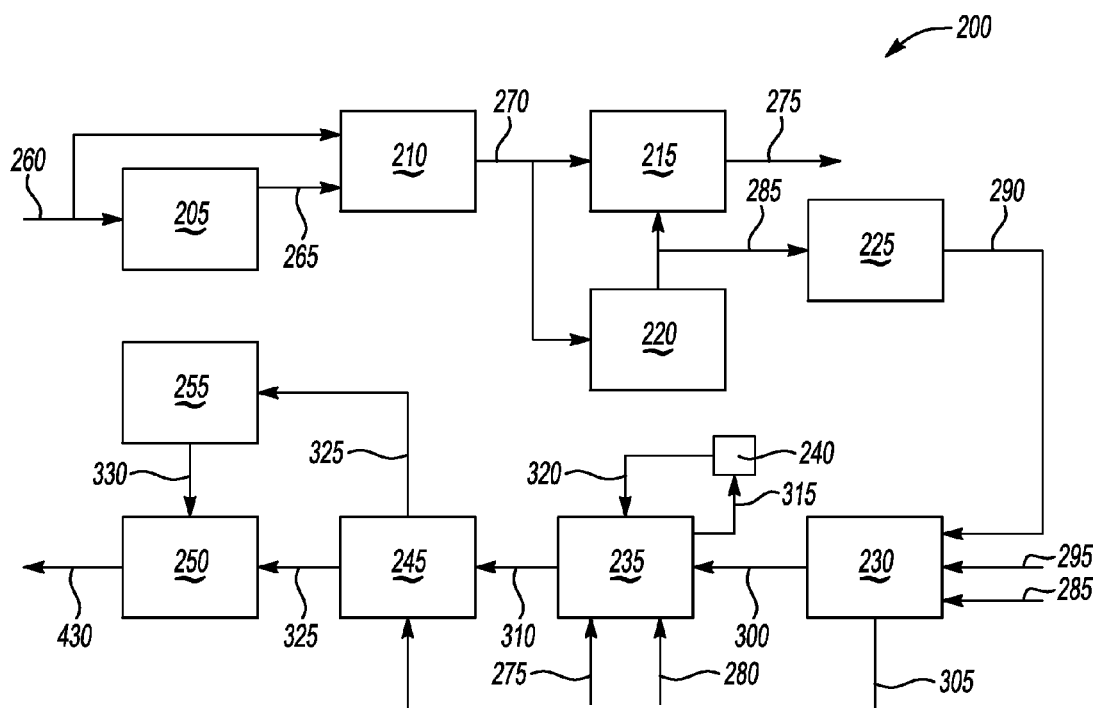
FIG. 2 is a signal flow diagram of an example control system that may be used by the controller of FIG. 1.

FIG. 2 illustrates a signal flow diagram of an example control system 200 that may be used by the controller 130 to simultaneously detect and substantially dampen the unstable regular and irregular oscillations of a performance signal. As illustrated, the control system 200 may include a mean module 205, a deviation module 210, a peak module 215, a sign change module 220, a counter module 225, a trigger module 230, an analysis module 235, a first timer module 240, a merge module 245, a latch module 250, and a second timer module 255.

The mean module 205 may be configured to receive a performance signal 260 representing the speed of the engine 105, the first motor 110, the second motor 115, and/or the input speed of the gearbox 120. Alternatively, the performance signal 260 may represent the amount of torque generated by one or more of the engine 105, the first motor 11, or the second motor 115. The mean module 205 may be further configured to determine the mean of the performance signal 260 and output a mean signal 265 representing the mean of the performance signal 260.

The deviation module 210 may be configured to determine a deviation of the performance signal 260 relative to the mean signal 265. As such, the deviation module 210 may be configured to receive the performance signal 260 and the mean signal 265 and subtract the mean signal 265 from the performance signal 260 to generate a deviation signal 270.

The peak module 215 may be configured to determine the largest absolute magnitude of the deviation signal 270 at each sign change and generate a peak signal 275 representing the largest magnitude. For instance, the peak module 215 may identify a first oscillation peak as the first value and a second oscillation peak as the second value. Accordingly, the peak signal 275 may represent either the first value after one iteration of the signal flow diagram or the second value after a second iteration of the signal flow diagram. As used below, the term "peak signal" or "current peak signal" may represent the magnitude of the second or most current peak value while the term "previous peak signal" may represent the magnitude of the first or the previously determined peak value.

The sign change module 220 may be configured to determine whether the magnitude of the oscillation has changed from a positive value to a negative value, or vice versa, relative to the mean signal 265. The sign change module 220 is configured to receive the deviation signal 270, determine if the sign of the deviation signal 270 changed from positive to negative, or vice versa, and generate a sign change signal 285 indicating that the sign of the magnitude has changed. The sign change module 220 may be further configured to provide the sign change signal 285 to reset the peak module 215 so that the peak module 215 may capture another magnitude of the oscillation that are either above or below the mean, but not both.

The counter module 225 may be configured to count the amount of time that has elapsed since the previous sign change. Accordingly, the counter module 225 may be configured to receive the sign change signal 285 and reset the counter at the beginning of each sign change. The counter module 225 may be configured to output a counter signal 290 representing the amount of time that has elapsed since the previous sign change.

The trigger module 230 may be configured to enable the analysis module 235 based on certain conditions. For instance the trigger module 230 may be configured to receive the counter signal 290 generated by the counter module 225, the sign change signal 285 generated by the sign change module 220, and/or a threshold signal 295. The threshold signal 295 may be defined by a difference between a previous peak signal 280 determined by the peak module 215 and a predetermined threshold for the oscillation peak value. The trigger module 230 may be configured to enable the analysis module 235 based, at least in part, on conditions represented by the counter signal 290, the sign change signal 285, and/or the threshold signal 295. That is, the trigger module 230 may be configured to output a trigger signal 300 indicating that the analysis module 235 should be enabled if the conditions represented by, e.g., the counter signal 290, the sign change signal 285, and/or the threshold signal 295 are satisfied. The trigger module 230 may be further configured to output a no-trigger signal 305 if the conditions represented by, e.g., the counter signal 290, the sign change signal 285, and/or the threshold signal 295 are not satisfied.

The analysis module 235 may be configured to simultaneously detect regular and irregular oscillations of the performance signal 260 based on, e.g., the first value and the second value. As discussed above, the first value and the second value may represent either positive or negative magnitudes of the first oscillation peak and the second oscillation peak, respectively. The analysis module 235 may use the current peak signal 275 and the previous peak signal 280 to simultaneously detect the regular and irregular oscillations of the performance signal 260. Moreover, as discussed in greater detail below with respect to FIG. 3, the analysis module 235 may output a latch signal 310 if unstable regular or irregular oscillations are detected. Also, the analysis module 235 may be configured to output a timer control signal 315.

The first timer module 240 may be configured to count the amount of time since the last unstable oscillation peak was detected. The first timer module 240 may be configured to receive the timer control signal 315 from the analysis module 235 and output a first reset signal 320 to the analysis module 235 to clear a counter in the analysis module 235, as discussed in greater detail in FIG. 4.

The merge module 245 may be configured to output a merged signal 325 that represents the most recently received input signal. As illustrated, the merge module 245 is configured to receive the latch signal 310 from the analysis module 235 and the no-trigger signal 305 from the trigger module 230. The merged signal 325, therefore, may represent either the latch signal 310 or the no-trigger signal 305 based on, e.g., whichever of the signals was received later in time.

The latch module 250 may be configured to receive the merged signal 325 that, as discussed above, may represent the latch signal 310 or the no-trigger signal 305. The latch module 250 may output an unstable flag signal 430 that indicates that an unstable oscillation has been detected if the merged signal 325 represents the latch signal 310.

The second timer module 255 may be configured to count the amount of time that has elapsed since the last unstable oscillation was detected. Moreover, the second timer module 255 may be configured to reset the latch module 250 when no oscillations are detected. The second timer module 255 may be configured to receive the merged signal 325 and reset the latch module 250 using a second reset signal 330, e.g., upon receipt of the merged signal 325 that represents the no-trigger signal 305.

Figure 3:
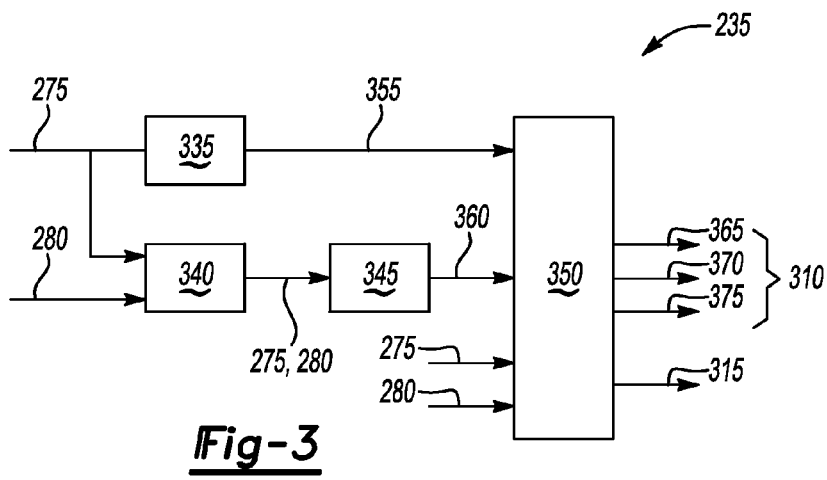
FIG. 3 is a signal flow diagram of an example analysis module that may be used in the control system of FIG. 2.

FIG. 3 illustrates an example signal flow diagram of an example analysis module 235 that may be used by the controller 130 to, e.g., simultaneously detect the regular and irregular oscillations of the performance signal 260. For instance, the signal flow diagram of FIG. 3 may be used to implement the example analysis module 235 illustrated in the control system 200 of FIG. 2. As illustrated, the analysis module 235 includes a moving average module 335, a peak threshold module 340, a filter module 345, and an oscillation detection module 350.

The moving average module 335 may be configured to determine the moving average of the current peak signal 275 and output a moving average peak signal 355 representing the moving average of the oscillation peak signal.

The peak threshold module 340 may be configured to receive the previous peak signal 280 and the current peak signal 275 and determine whether a difference between the previous peak signal 280 and the current peak signal 275 should be ignored. For instance, the peak threshold module 340 may be configured to compare the difference between the previous peak signal 280 and the current peak signal 275 to a jump limit that defines a maximum allowable increase of the current peak signal 275 relative to the previous peak signal 280. This way, the peak threshold module 340 may filter anomalous jumps in the performance signal 260. In one possible approach, the peak threshold module 340 may compare the difference between the current peak signal 275 and the previous peak signal 280 to the magnitude of the previous peak signal 280 to determine the percent that the current peak signal 275 has changed relative to the previous peak signal 280. If the percent that the current peak signal 275 has changed relative to the previous peak signal 280 is less than the jump limit, the peak threshold module 340 may output the current peak signal 275. If, however, the percent that the current peak signal 275 has changed exceeds the jump limit, the peak threshold module 340 may output the previous peak signal 280.

The filter module 345 may be configured to receive either the current peak signal 275 or the previous peak signal 280, depending on the output of the peak threshold module 340, and filter the signal received. For instance, the filter module 345 may be configured to apply a low pass filter to the current peak signal 275 or the previous peak signal 280 to, e.g., remove a high-frequency component of the received signal to generate the filtered peak signal discussed above with respect to FIG. 1. The filter module 345 may output a filtered oscillation peak signal 360.

The oscillation detection module 350 may be configured to simultaneously detect the regular and irregular oscillations of the performance signal 260. In one possible implementation, the oscillation detection module 350 may receive the current peak signal 275, the previous peak signal 280, the current moving average peak signal 355, the previous moving average peak signal 355 created by, e.g., applying a unit hold module (not shown) to the current moving average peak signal 355, the current filtered oscillation peak signal 360, and the previous filtered oscillation peak signal 360 created by, e.g., applying a unit hold module (not shown) to the current filtered oscillation peak signal 360. The oscillation detection module 350 may use these and possibly other signals to detect the regular and irregular oscillations of the performance signal 260. The oscillation detection module 350 may output the latch signal 310, such as a spike latch signal 365, a growing latch signal 370, and/or a ringing latch signal 375 based on one or more of the signals received. This way, the latch signal 310 may represent each type of oscillation detected. Moreover, the oscillation detection module 350 may receive the first reset signal 320 generated by the first timer illustrated in FIG. 2 to reset one or more of the output signals, and the oscillation detection module 350 may output a timer control signal 315 to control (e.g., reset) the first timer module 240. These and other features of the oscillation detection module 350 are described in greater detail below with respect to FIG. 4.

Figure 4:
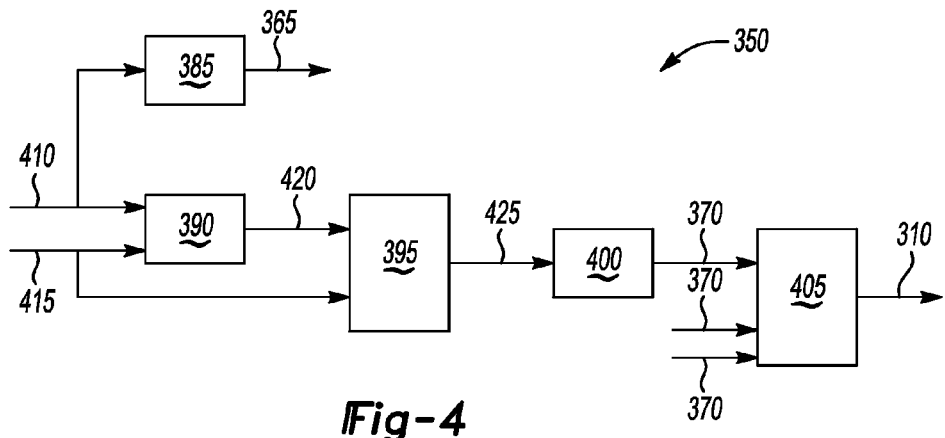
FIG. 4 is a signal flow diagram of an example oscillation detection module that may be used in the analysis module of FIG. 3.

FIG. 4 is a signal flow diagram of an example oscillation detection module 350 that may be used with the analysis module 235 illustrated with respect to FIGS. 2 and 3. The oscillation detection module 350 may include a spike detection module 385, a magnitude change module 390, a percent change module 395, a comparator module 400, and a combination module 405.

The spike detection module 385 may be configured to receive a current signal 410 representing the most recently determined peak value of one of the oscillations detected. The current signal 410, therefore, may include the current peak signal 275, the current moving average peak signal 355, or the current filtered peak signal 360. The spike detection module 385 may be configured to compare the current signal 410 received to a spike threshold limit and output the spike latch signal 365 if the current signal 410 received is greater than or equal to the spike threshold limit. In one possible approach, the spike detection module 385 may be independent of the oscillation detection module 350, and thus, may be part of the analysis module 235 discussed with respect to FIGS. 2 and 3.

The magnitude change module 390 may be configured to receive the current signal 410 and a previous signal 415. The current signal 410 may include, as discussed above, the current peak signal 275, the current moving average peak signal 355, or the current filtered peak signal 360. The previous signal 415 may include the previous peak signal 280, a previous moving average peak signal 355, or a previous filtered peak signal 360. The magnitude change module 390 may be configured to output a difference signal 420 representing the difference between the magnitudes of the current signal 410 and the previous signal 415.

The percent change module 395 may be configured to compare a magnitude represented by the difference signal 420 to a magnitude represented by the previous signal 415 to generate a percent change signal 425. The percent change signal 425, therefore, may represent the difference between the current peak and the previous peak as a percentage of the previous peak.

The comparator module 400 may be configured to identify whether the percent change signal 425 indicates that the oscillations of the performance signal 260 exceeds a predetermined limit. In one possible approach, the comparator module 400 may compare the percentage represented by the percent change signal 425 to a calibration limit. If the comparator module 400 detects an over-limit oscillation based on the percentage, the comparator module 400 may increment a counter. When the counter exceeds a calibration count limit, the comparator module 400 may output the latch signal 310, as discussed above with respect to FIGS. 2 and 3. The comparator module 400 may further receive the first reset signal 320 as discussed above with reference to FIG. 2 to clear the counter under certain circumstances, such as when a predetermined amount of time has elapsed since the last count.

Although only one is illustrated in FIG. 4, the oscillation detection module 350 may include multiple comparator modules 400. For instance, each comparator module 400 may be used to detect either the ringing condition or the growing condition based on current and previous moving average peak signals 355 or current and previous filtered peak signals 360. Moreover, other comparator modules 400 may be used to detect the ringing condition or the growing condition for current signals 410 and previous signals 415 that are either above or below the mean of the performance signal 260.

If multiple comparator modules 400 are used, the oscillation detection module 350 may further include one or more combination modules 405. Each combination module 405 may receive the latch signal 310, such as the growing latch signal 370 (as illustrated in FIG. 4) or the ringing latch signal 375, output by one or more of the comparator modules 400 and apply a logical OR to each latch signal 310 received. For instance, if multiple comparator modules 400 are configured to detect the ringing condition, one of the combination modules 405 may be configured to receive each latch signal 375 representing the ringing condition. Additionally, if multiple comparator modules 400 are configured to detect the growing condition, another of the combination modules 405 may be configured to receive each latch signal 370 representing the growing condition. Each combination module 405, therefore, may output, e.g., the growing latch signal 370 or the ringing latch signal 375, depending on the latch signal 310 received from the comparator module 400.

Figure 5:
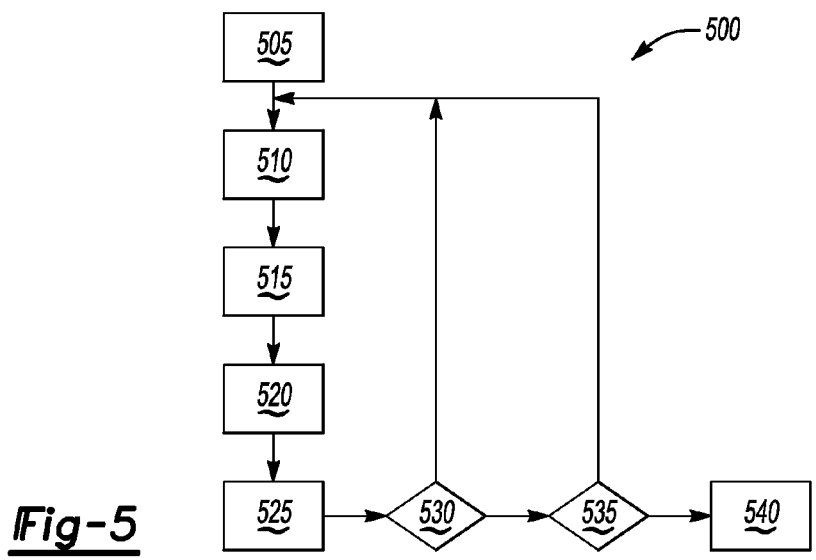
FIG. 5 illustrates an example flowchart of a process that may be used by the controller of FIG. 1.

FIG. 5 illustrates an example flowchart of a process 500 that may be used by the controller 130 to simultaneously detect and substantially dampen the unstable regular and irregular oscillations of the performance signal 260.

At block 505, the controller 130 may generate or receive the performance signal 260 having a plurality of oscillation peaks. As discussed above, the performance signal 260 may represent the rotational speed of, e.g., the engine 105, the first motor 110, the second motor 115, or the input speed of the gearbox 120. Alternatively, the performance signal 260 may represent the amount of torque generated by one or more of the engine 105, the first motor 110, or the second motor 115. The controller 130 may be configured to determine the performance signal 260 from a speed or torque sensor (not shown), or derive the performance signal 260 from control signals provided to the engine 105, the first motor 110, or the second motor 115.

At block 510, the controller 130 may determine a mean of the performance signal 260 based on, e.g., the oscillations of the performance signal 260. In one possible approach, the controller 130 may determine the mean of the performance signal 260 using a mean module 205 as described above with respect to FIG. 2.

At block 515, the controller 130 may define oscillations of the performance signal 260 based on the mean of the performance signal 260 determined at block 510. For example, the controller 130 may use a deviation module 210 as illustrated in FIG. 2, discussed above, to define the oscillations.

At block 520, the controller 130 may detect a sign change based on the deviations of the performance signal 260 relative to the mean. That is, the controller 130 may determine whether a magnitude of the oscillation has switched from a positive value (e.g., above the mean) to a negative value (e.g., below the mean), or vice versa.

At block 525, a controller 130 may identify the peak values of the oscillation. For example, the controller 130 may define a first value representing the magnitude of a first oscillation peak relative to the mean of the performance signal 260 and a second value representing the magnitude of a second oscillation peak relative to the mean of the performance signal 260.

At decision block 530, the controller 130 may determine whether to trigger the analysis module 235 to simultaneously detect the regular and irregular oscillations of the performance signal 260 in light of the first value and the second value determined at block 525. In one possible approach, the controller 130 may trigger the analysis module 235 using one or more of the counter signal 290, the sign change signal 285, and/or the threshold signal 295. If the controller 130 determines to trigger the analysis module 235, the process 500 may continue at block 535. If, however, the controller 130 determines not to trigger the analysis module 235, the process 500 may return to block 510.

At decision block 535, the controller 130 may simultaneously determine whether the performance signal 260 includes unstable regular or irregular oscillations. For instance, the controller 130 may determine whether the performance signal 260 is growing, ringing, or has spiked based on, e.g., the first value and the second value. To detect unstable oscillations, the controller 130 may compare the first peak value to the second peak value, and may detect the oscillation if the difference between the first and second peak values indicates a growing or ringing condition. Additionally, the controller 130 may calculate a first moving average value and a second moving average value of an oscillation peak signal from the performance signal 260. The controller 130 may detect the unstable oscillations if the difference between the first and second moving averages indicates that the performance signal 260 is growing or ringing. Additionally, the controller 130 may identify unstable oscillations from the filtered oscillation peak signal 360, as discussed above. That is, the controller 130 may apply a low pass filter to the oscillation peak signal derived from the performance signal 260 to generate the filtered oscillation peak signal and detect the unstable oscillations if the filtered oscillation peak signal is growing or ringing. Furthermore, the controller 130 may detect the unstable oscillations from a spike condition based on the difference between the first value and the second value. If the controller 130 identifies the growing condition, the ringing condition, or the spiking condition the process 500 may continue at block 540. If, however, the controller 130 determines that the performance signal 260 is stable or that the oscillations are not sufficient to warrant any remedial action, the process 500 may return to block 510.

At block 540, the controller 130 may take a remedial action such as substantially dampening the detected unstable regular and/or irregular oscillations by, e.g., adjusting vehicle speed control strategies.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
at least one motor configured to generate a motor torque;
a gearbox configured to receive the motor torque, wherein an input speed of the gearbox is at least partially defined by the motor torque; and
a controller configured to identify oscillation peaks of a performance signal representing at least one of a rotational speed of the motor, the input speed of the gearbox, and the motor torque;
wherein the controller is configured to determine a mean of the performance signal, identify a first value representing a first oscillation peak of the performance signal and a second value representing a second oscillation peak of the performance signal based at least in part on the mean of the performance signal, simultaneously detect unstable regular and irregular oscillations of the performance signal based at least in part on the first value and the second value, and substantially dampen the unstable regular and irregular oscillations detected.

2. A vehicle as set forth in claim 1, wherein the controller is configured to calculate a first moving average value of the oscillation peaks identified from the performance signal and a second moving average value of the oscillation peaks identified from the performance signal.

3. A vehicle as set forth in claim 2, wherein the controller is configured to compare the first moving average value to the second moving average value and detect the irregular oscillations of the performance signal based at least in part on a difference between the first and second moving averages.

4. A vehicle as set forth in claim 1, wherein the controller is configured to identify an oscillation peak signal that includes the first oscillation peak and the second oscillation peak, apply a low pass filter to the oscillation peak signal to generate a filtered oscillation peak signal and calculate a first filtered peak value and a second filtered peak value from the filtered oscillation peak signal.

5. A vehicle as set forth in claim 4, wherein the controller is configured to compare the first filtered peak value to the second filtered peak value and detect the irregular oscillations of the performance signal based at least in part on a difference between the first and second filtered peak values.

6. A vehicle as set forth in claim 1, wherein the controller is configured to identify a spike condition based at least in part on a difference between the first value and the second value and wherein the controller is further configured to detect the irregular oscillations of the performance signal based at least in part on the spike condition.

7. A vehicle as set forth in claim 1, wherein the controller is configured to identify a growing condition and detect at least one of the regular and irregular oscillations of the performance signal based at least in part on the growing condition.

8. A vehicle as set forth in claim 1, wherein the controller is configured to identify a ringing condition and detect at least one of the regular and irregular oscillations of the performance signal based at least in part on the ringing condition.

9. A vehicle as set forth in claim 1, wherein the controller is configured to identify the first value and the second value as each having a magnitude greater than the mean of the performance signal.

10. A vehicle as set forth in claim 1, wherein the controller is configured to identify the first value and the second value as each having a magnitude less than the mean of the performance signal.

11. A method comprising:
determining a mean of a performance signal having oscillation peaks and representing a rotational speed of or an amount of torque generated by a hybrid vehicle component;
defining a first value representing a magnitude of a first oscillation peak relative to the mean of the performance signal;
defining a second value representing a magnitude of a second oscillation peak relative to the mean of the performance signal;

simultaneously detecting, via a controller, unstable regular and irregular oscillations of the performance signal based at least in part on the first value and the second value; and substantially dampening at least one of the detected unstable regular and irregular oscillations.

12. A method as set forth in claim 11, wherein detecting the unstable oscillations of the performance signal includes:
determining a difference between the first value and the second value; and
detecting the unstable oscillations of the performance signal based at least in part on the difference between the first and second values.

13. A method as set forth in claim 11, wherein detecting the unstable oscillations of the performance signal includes calculating a first moving average and a second moving average of the oscillation peaks of the performance signal.

14. A method as set forth in claim 13, wherein detecting the unstable oscillations of the performance signal includes:
determining a difference between the first and second moving averages; and
detecting the unstable oscillations of the performance signal based at least in part on the difference between the first and second moving averages.

15. A method as set forth in claim 11, wherein detecting the unstable oscillations of the performance signal includes:
filtering the oscillation peaks of the performance signal to generate a filtered oscillation peak signal; and
detecting the unstable oscillations of the performance signal based at least in part on the filtered oscillation peak signal.

16. A method as set forth in claim 11, wherein detecting the unstable oscillations includes identifying a spike condition based at least in part on a difference between the first value and the second value.

17. A method as set forth in claim 11, wherein detecting the unstable oscillations includes identifying a growing condition.

18. A method as set forth in claim 11, wherein detecting the unstable oscillations includes identifying a ringing condition.

19. A vehicle comprising:
an engine configured to generate an engine torque;
a first motor configured to generate a first motor torque;
a second motor configured to generate a second motor torque;
a gearbox configured to receive at least one of the engine torque, the first motor torque, and the second motor torque, wherein an input speed of the gearbox is at least partially defined by at least one of the engine torque, the first motor torque, and the second motor torque; and
a controller configured to identify oscillation peaks of a performance signal representing at least one of a rotational speed of the engine, a rotational speed of the first motor, a rotational speed of the second motor, the input speed of the gearbox, the engine torque, the first motor torque, and the second motor torque;
wherein the controller is configured to determine a mean of the performance signal and identify a first value representing a magnitude of a first oscillation peak of the performance signal and a second value representing a magnitude of a second oscillation peak of the performance signal based at least in part on the mean of the performance signal;
wherein the controller is configured to simultaneously detect unstable regular and irregular oscillations based on at least one of:
a first moving average and a second moving average of the oscillation peaks identified from the performance signal,
a filtered oscillation peak signal generated by applying a low pass filter to an oscillation peak signal that includes the first oscillation peak and the second oscillation peak, and
a magnitude of the first value and the second value;
wherein the controller is further configured to substantially dampen the unstable regular and irregular oscillations detected.

* * * * *